2,785,018
Patented Mar. 12, 1957

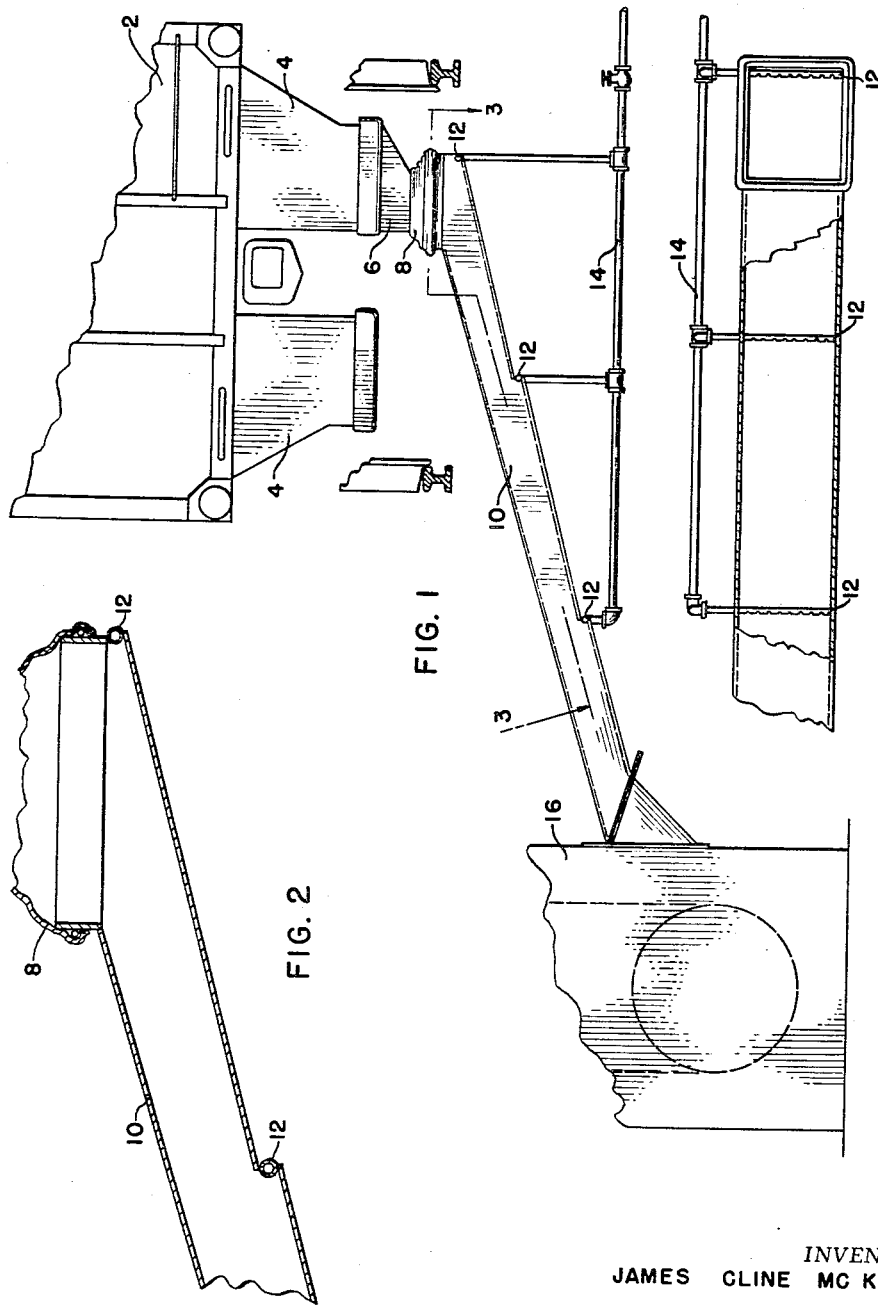

2,785,018

MATERIAL HANDLING METHOD

James Cline McKenna, University Heights, Ohio, assignor to Diamond Alkali Company, Cleveland, Ohio, a corporation of Delaware Application February 17, 1951, Serial No. 211,561

2 Claims. (Cl. 302—29)

This invention relates to the transportation of solid materials in bulk, and more particularly relates to a method for moving free-flowing, finely-divided solids, such as soda ash and the like, in continuous conveyors for relatively short distances. The invention has particular application to the unloading of hopper bottom cars which, as is known, are employed for the purpose of railroad transportation of solid powdered materials in bulk. This is a continuation-in-part of my copending application Ser. No. 640,336, filed January 10, 1946, now abandoned.

Various means have heretofore been proposed for continuous conveyance of finely-divided solids through distances, such as are encountered in the unloading of hopper cars and the like. These have included on the one hand provision of purely gravity unloaders, whereby the material to be unloaded is simply dumped from the hopper of the car, and on the other hand provision of the aerating type of unloader, where a continuous membrane permeable to the passage of a gaseous fluid is provided having substantially no inclination whatsoever or perhaps a slight inclination, and wherein sufficient air is passed through the porous membrane to aerate or fluidize the material being unloaded, whereby the same is carried to its destination.

The gravity means of unloading is feasible in some instances, especially where excavations of considerable depth are available at unloading sites. However, the expense of excavation is substantial and the inconvenience of a deep excavation at the point of unloading is often not to be borne, whereby this means of unloading has come to disfavor. The aerating type of unloader also operates with efficiency on certain installations, but has the disadvantage of substantial expense in that a considerable compressed air system must be provided in order to render the same practicable in use. Moreover, it presents a problem of maintenance of the porous conveyor surface, especially since the danger of the finely-divided solid materials clogging and impregnating the same always exists.

It is an object of the present invention to provide a conveyor means for free-flowing, finely-divided solid materials in bulk which requires but relatively slight inclination to the horizontal, whereby especially in car unloading operations, deep excavations are avoided.

It is a further object of the invention to provide a transportation means for bulk, finely-divided solids which, though inclined at an angle to the horizontal considerably less than that necessary for completely gravity conveyance, may nevertheless be operated with substantial reliance upon the aid of gravity and with but minimum reliance upon the aid of a gaseous fluid under pressure.

In accordance with the objects stated hereinabove, the present invention contemplates a method for moving free-flowing, finely-divided solids without substantial dusting, which includes delivering such a solid to a conduit inclined at an angle to the horizontal plane less than the angle of repose of the solid and enclosed from the open atmosphere, introducing a gaseous fluid beneath such solid at points in said conduit spaced apart at intervals governed by the setting up of the solid in repose in the conduit, the gas being introduced under a pressure sufficient only to destroy the repose of the solid in the conduit, whereby the solid moves continuously downwardly through the conduit under the influence of gravity.

In accordance with the present disclosure, the term "angle of repose" is taken to mean the angle with the horizontal at which the material will stand when piled. It will be appreciated that unless the angle of repose is exceeded in some manner, the material will not flow through the conduit. The present invention combines the effect of gravity, which seeks to move the material through the conduit, and an induced reduction of the angle of repose, which permits gravity to act on the material, whereby it flows through the conduit. It will be particularly noted that only that amount of gas, such as air, necessary to destroy the angle of repose need be employed in the method of the present invention and that therefore the difficulties and disadvantages arising from aeration of finely-divided materials, such as dusting and the like, which problems are notable even in closed conveyors where some loss of material and disadvantageous personnel situations are encountered, are avoided. In no sense is the present invention directed to the aerating of the solids involved as has been taught in the prior art, since insufficient air is employed to provide true aeration or fluidization; on the contrary, only sufficient air is used to reduce the angle of repose and cause the material to slip in the conduit.

It will be appreciated that the particle size of the solids to be transported, or in the case of the hopper car operation, unloaded, will determine to some extent the specific flow characteristics and angle of repose of the material and thus the necessary inclination of the conduit and the spacing of the inlets for fluid gas pressure, as well as the minimum volume of gas necessary to destroy the repose of the material in the conduit. It will further be appreciated that the heavier coarser materials will, depending upon their angle of repose, require a greater inclination of the conveyor and quite possibly a greater volume of air possibly at less spaced distances along the conveyor way than finer, more easily flowing materials.

Examples of operations which have been carried on in accordance with the present invention include the transportation of light soda ash from a hopper car to a suitable receptacle, it being found that light soda ash has an angle of repose of about 37½°. Under these circumstances, a conduit disposed at a 20° angle, having side walls and being covered about 8 inches above the conduit level and about 12 inches in width, will suitably convey light soda ash when air under 5–7 pounds per square inch gauge pressure is applied at intervals along the conveyor of approximately 3–4 feet.

Simple experimentation with similar materials to be conveyed may be had when it is considered that the angle of repose of most dry, free-flowing materials is well known or subject to simple ascertainment. For example, the following may be cited as known angles of repose of materials of this general order:

| | Degrees |
|---|---|
| Granular soda ash | 35½. |
| Coarse sand | 35. |
| Unhydrated lime | 45. |
| Portland cement (cement can be brought to a 48½° angle before it slips downward until the angle of the side of the conical pile is 40°). | 40 to 48½. |

It will be understood that no limitation of the method of the present invention is intended by citation of these specific examples as the principle of the present invention may be conveniently applied to any relatively free-flowing, pulverulent, solid material which it is desired to convey in a continuous conveyor system. Moreover, while air is the most suitable gaseous fluid to be employed for the purpose of destroying the repose of the solid in the inclined conveyor, any other suitable inert gas may be employed as desired.

Illustrative of an apparatus in which the present invention may be practiced are the accompanying drawings forming a part of the specification, in which:

Fig. 1 is an elevation of an apparatus employing the principles of the invention as applied to a railroad hopper car, parts of the drawing being in section;

Fig. 2 is an enlarged sectional view of a portion of Fig. 1; and

Fig. 3 is a section taken on the line 3—3 of Fig. 1.

Referring to the drawings, a conventional hopper car 2 is shown having outlet chute 4, to which may be secured by any suitable means auxiliary chute means 6 having flexible connector 8, which may suitably be of canvas or other dust-retaining cloth, and which is secured to conduit 10, forming a complete passage from the interior of car 2 to the conduit 10, through which the material to be unloaded, suitably light soda ash for the purpose of this specific construction, will fall entirely by gravity and require no assistance.

Conduit 10 is provided at spaced points with air ducts 12, which may, as shown, if desired, be inserted in the conduit 10 in the form of risers, so that a slight actual fall exists at the point of the air outlet, though this feature is of no significance to the present invention. As shown more particularly in Fig. 3, air ducts 12 are suitably perforated across the entire width of conduit 10, air being applied thereto from manifold 14, which itself is attached to a source of compressed air (not shown).

Conduit 10 leads to any suitable delivery point, in the present case the point being shown diagrammatically as elevator 16, from which the material conveyed from the car and away from the railroad facility may suitably be disposed in any storage point as desired.

The practice of the method of the present invention in the apparatus described will be seen to be quite simple in view of the description of the apparatus above. Thus, in order to unload the car 2, suitable adjustments are made in the outlet chute 4 to open the same and the soda ash, in this case, descends by gravity into the top of the conduit 10, filling the same. Upon destroying the angle of repose of the material by turning on the air pressure as described above, amounting to 5–7 pounds of superatmospheric pressure, through the air ducts 12, the material will flow from the point at the uppermost end of the conduit 10 down the conveyor and will set up again at about the point where the second duct 12 is shown, except that of course air is also applied at this point, whereby the setting up of the material is prevented and the material thus continues to flow to the next set-up point, where again air destroys its repose until the material eventually arrives in the elevator 16 and may be conveyed by conventional means to the desired storage point. It will be appreciated that the flow of material is continuous until the compartment of the car or the complete car served by the mechanism is emptied of the solid to be moved.

Thus, in accordance with the present invention, means are shown for unloading hopper cars and for conveying solid, pulverulent materials generally which rely upon the movement imparted to the materials by gravity and rely also upon a slight fluid gas pressure at points in the conduit provided where the material sets up into a state of repose, whereby the repose of the material is destroyed and the sliding progress of the material is continued.

While there have been described various embodiments of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of conveying free-flowing, finely-divided solid materials without substantial dusting, which comprises the steps of delivering a quantity of such solids into a gas-impermeable conduit inclined at an angle to the horizontal less than the angle of repose of such solids, and applying gas under pressure beneath said solids sufficient only to destroy the repose of said solids in said conduit, said gas being introduced beneath said solids at a plurality of spaced points in said conduit, whereby the solids move continuously downwardly through the conduit under the influence of gravity.

2. The method for moving free-flowing, finely-divided solids without substantial dusting, which includes the steps of delivering said solids to a gas-impermeable conduit inclined at an angle to the horizontal plane less than the angle of repose of said solids and enclosed from the atmosphere, introducing gas beneath said solids at points in said conduit spaced apart at intervals governed by the setting up of the solids in repose in the conduit, said gas being introduced under pressure sufficient only to destroy the repose of said solids in said conduit, whereby the solids move continuously downwardly through the conduit under the influence of gravity.

References Cited in the file of this patent
UNITED STATES PATENTS

| | | |
|---|---|---|
| 545,013 | Dodge | Aug. 20, 1895 |
| 1,842,416 | Ludwig | Jan. 26, 1932 |
| 1,971,853 | Ihlefeldt | Aug. 28, 1934 |
| 2,527,455 | Schemm | Oct. 24, 1950 |